United States Patent [19]

Dougherty et al.

[11] 4,100,253
[45] Jul. 11, 1978

[54] RECOVERY OF SODIUM AND ANTIMONY VALUES FROM SPENT ETHYLENE GLYCOL RESIDUES

[75] Inventors: Steve John Dougherty; Kenneth Joseph Garska, both of Saint Albans, W. Va.

[73] Assignee: Union Carbide Corporation, New York, N.Y.

[21] Appl. No.: 699,977

[22] Filed: Jun. 25, 1976

[51] Int. Cl.² .................................... C01B 29/02
[52] U.S. Cl. .............................. 423/87; 423/208
[58] Field of Search .......... 423/87, 207, 208, 617, 423/421, 593; 252/416, 420

[56] References Cited

U.S. PATENT DOCUMENTS

| | | | |
|---|---|---|---|
| 1,747,709 | 2/1930 | Hall | 423/87 |
| 3,367,847 | 2/1968 | Pierson | 203/41 |
| 3,367,847 | 2/1968 | Pierson | 260/637 R |
| 3,491,161 | 1/1970 | Pitts | 423/637 |
| 3,536,768 | 10/1970 | Pitts | 423/637 |
| 3,554,859 | 1/1971 | Murray | 423/DIG. 3 |
| 3,698,860 | 10/1972 | Shiba | 423/DIG. 3 |
| 3,761,568 | 9/1973 | Brink et al. | 423/DIG. 3 |
| 3,840,641 | 10/1974 | Wampfler et al. | 423/207 |

FOREIGN PATENT DOCUMENTS 108,269  10/1958  Pakistan .......................... 423/207

OTHER PUBLICATIONS

Handbook of Chemistry and Physics, 43rd Edition (1961), pp. 536, 537, 650–653.

Primary Examiner—Earl C. Thomas
Assistant Examiner—Wayne A. Langel
Attorney, Agent, or Firm—Bernard Lieberman

[57] ABSTRACT

A process for recovering antimony and sodium compounds from antimony-containing spent ethylene glycol residues resulting from the manufacture of polyethylene-terephthalate polyester, which comprises combusting the spent glycol residues to produce an ash, and then contacting the ash with water to form an ash-water mixture having a liquid phase and a solid phase, the water-soluble sodium compounds being essentially contained in the liquid phase and the water-insoluble antimony compounds being essentially contained in the solid phase. The liquid phase and solid phase are then separated in order to recover therefrom sodium and antimony compounds, respectively.

5 Claims, No Drawings

RECOVERY OF SODIUM AND ANTIMONY VALUES FROM SPENT ETHYLENE GLYCOL RESIDUES

This invention relates, in general, to the environmentally safe disposal of spent ethylene glycol residues derived from the manufacture of terephthalate polyester. More particularly, this invention is concerned with the separation and recovery of toxic antimony compounds from the aforesaid residues.

Heavy metal oxides are used by polyester manufacturers to catalyze the polymerization of monomeric bis-(2-hydroxyethyl)terephthalate to polyethylene terephthalate. Antimony oxide is a particularly preferred catalyst because of its relative low cost and high efficiency. See for example, Elkin, "Polyethylene Terephthalate", Stanford Research Institute Report, 18 A, January 1972.

The most common method of preparing bis-(2-hydroxyethyl)terephthalate monomer is by reacting an excess of ethylene glycol with either dimethyl terephthalate or terephthalic acid at greater than atmospheric pressure and at temperatures of about 200° C and above. Ethylene glycol is a by-product of the subsequent polymerization reaction which produces the terephthalic polyester. The ethylene glycol which is recovered at the completion of the reaction consists essentially of ethylene glycol condensate produced during polymerization and excess glycol reactant introduced during the esterification reacton. This recovered glycol stream is commonly referred to as "spent" glycol.

Recovered or "spent" glycol generally contains from about 80–98 percent ethylene glycol, by weight, — the remainder consisting of contaminants such as water, acetaldehyde, methanol, sodium and antimony compounds, esters and higher glycols. Consequently, spent glycol must be purified before it can be reused in the polyester manufacturing process. A typical composition of spent ethylene glycol is disclosed in U.S. Pat. No. 3,367,847.

Several techniques are disclosed in the art for processing spent glycol solutions to recover "polyester grade" ethylene glycol. One method is to pretreat the spent glycol with ammonia and thereafter recover the ethylene glycol by distillation. U.S. Pat. Nos. 3,491,161 and 3,536,768 are descriptive of such a process. In accordance with another method which has gained commercial acceptance, aqueous sodium hydroxide is used to pretreat the spent glycol prior to distillation; the effect of sodium hydroxide being to reduce the volatility of aldehydes and phenolic salts and thereby allow for greater recovery of polyester grade glycol. U.S. Pat. No. 3,367,847 discloses still another method whereby the solid impurities (principally sodium salts of terephthalic acid) are initially removed from the spent glycol solution by flash evaporation followed by fractional distillation of the solution to remove the volatile components and recover pure ethylene glycol. The ethylene glycol which is not recovered from the spent solution (generally from about 5 to 50%, by weight, depending upon the particular recovery technique employed) together with the remaining liquid and solid impurities are referred to herein as "spent ethylene glycol residues".

The disposal of such spent ethylene glycol residues in a relatively simple and environmentally acceptable manner poses a major problem for polyester manufacturers. Primarily, this is due to the presence of potentially toxic antimony compounds in the residues. The antimony compounds normally used as catalyst for the polymerization reaction are believed to be slowly removed under the polymerization reaction conditions of high temperatures and low pressure, contaminating the recovered ethylene glycol, and hence the resulting glycol residues. U.S. Pat. No. 3,367,847 to Pierson has suggested that unrecovered glycol and solid impurities, (i.e., the spent residues) may be disposed of by incineration. The Pierson patent, however, fails to address itself to the toxicity problem posed when antimony compounds are present in the spent glycol stream which would preclude disposing of the ash resulting from such incineration in a conventional manner. Since incineration of spent glycol produces an ash consisting essentially of the non-volatile components thereof, generally, sodium and antimony compounds, the concentration of antimony in the ash (about 1–7 weight percent) is markedly higher than in the spent glycol solution thereby creating a potentially serious ecological hazard if such ash were to be processed and disposed of by conventional techniques.

SUMMARY OF THE INVENTION

This invention provides a process for disposing of antimony-containing ethylene glycol residues while recovering the sodium and antimony values therein. Briefly, in accordance with the invention, the residues are initially converted to an ash by combusting same with an oxygen-containing gas, preferably air, and thereafter separating and recovering the two major constitutents of the ash, the sodium and antimony compounds, in order that they may be further utilized. Following combustion of the glycol residues, the resulting ash is essentially comprised of the non-volatile sodium and antimony compounds. The ash is then contacted with water to effect a separation of the water-soluble sodium compounds from the relatively water-insoluble antimony compounds; the sodium compounds being predominantly concentrated in the resulting liquid phase of the ash-water mixture and the insoluble antimony compounds in the insoluble solid phase of the mixture. The liquid and solid phases may then be readily separated and the sodium and antimony compounds recovered therefrom, respectively.

An important feature of the present invention is that the sodium and antimony compounds can be separated and concentrated to a relatively high purity, sufficiently free of contamination from the other, to enable the sodium compounds (primarily, sodium carbonate) to be utilized in an industrial process, such as, glass manufacturing, and the antimony compounds (principally in the form of sodium antimonate) to be utilized by antimony oxide producers. The soluble liquid phase produced in accordance with the invention may be dried to provide a sodium carbonate mixture wherein the concentration of antimony contaminant is below its allowable maxium insofar as glass manufacturing is concerned, namely, about 2,000 ppm. Above this impurity level, antimony adversely affects the quality of the glass product thereby precluding using such sodium carbonate in a glass-making furnace. Similarly, the antimony compounds in the ethylene glycol residues may be recovered and concentrated, in accordance with the process of the invention, so that they are sufficiently free of sodium compounds as to be acceptable for use by antimony oxide producers. That is, the antimony compounds contained in the insoluble fraction of the ash may be readily converted to pure antimony in a reducing furnace, provided the concentration of sodium impurity associated therewith is maintained below a level of about 15%, by weight, a concentration above which sodium adversely affects the refractory lining of the furnace.

In accordance with another feature of the invention, the concentration of antimony contaminant in the water-soluble fraction of the ash may optionally be reduced by various techniques, such as, precipitation of antimony with sulfide ion; complex precipitation with metal hydroxides, such as, mangnesium and ferrous hydroxide; and acidification (preferably with hydrochloridic acid) of the water-soluble fraction to a pH of about 1.9 to 5.5 to precipitate antimony out of solution. Conversely, the antimony content of the water-insoluble fraction of the ash, may be increased by pretreating the spent glycol residues with a strong acid prior to combustion, or oxidation with an oxidizing agent.

DETAILED DESCRIPTION OF THE INVENTION

A typical composition of spent ethylene glycol residues is as follows (expressed in terms of weight percent):

| | |
|---|---|
| Antimony | 0.3 % |
| Sodium | 2.7 % |
| Water | 34.4 % |
| Ethylene glycol | 44.1 % |
| Diethylene glycol | 1.5 % |
| Solids | 16.9 % |

Combustion of the glycol residues in accordance with the invention may be conveniently carried out in a furnace, such as, a John Zink (Tulsa, Oklahoma) thermal oxidizer at a furnace temperature within the range of 900°–2,000° F; the higher the temperature, the greater the tendency for sodium compounds in the spent glycol to form a flux with the refractory walls of the furnace. A temperature of about 1,800° F is preferred because it allows for satisfactory combustion of the spent glycol while minimizing refractory fluxing. A greater than stoichiometric amount of air is preferred for combustion such that the oxygen content of the resulting flue gas is in the approximate range of about 2–10%, by volume. Residence time in the furnace is preferably 1–4 seconds.

The ash produced by combustion of the spent glycol residues is essentially comprised of compounds of sodium and antimony, with lesser amounts of organics (0–0.4 wt.%) and less than about 1.0 wt.% of a mixture of oxides and carbonates of metals, such as, silicon, titanium, aluminum, manganese, copper, iron, magnesium, nickel, zinc, lead, calcium and chromium. The percentages of sodium and antimony in the ash are generally from about 37–43 (wt.) % and 1–7 (wt.) %, respectively, depending upon the original composition of the spent glycol. The bulk density of the ash is on the order of about 20 lbs./cu.ft.

Separation of the sodium and antimony components of the ash is predicated on the difference of water solubilities of sodium and antimony compounds. Separation is conveniently effected by contacting the ash with water to form a mixture ranging from about 20% ash — 80% water to 10% ash — 90% water, by weight. The mixture is then agitated and the insoluble fraction of the ash-water mixture removed by filtration, preferably under vacuum or by centrifugation. Approximately 10%, by weight, of the ash is insoluble in water. The composition of the insoluble fraction of the ash thus obtained is typically about 86 (wt.) % sodium antimonate; the compound being present in both the hydrated and anhydrous form. The balance is comprised of about 4% organics and about 10% of a complex mixture of carbonates and oxides of metals, such as sodium, calcium, chromium, lead, zinc, nickel, manganese, potassium, iron, copper, magnesium, aluminium, titanium, and silicon. The percentage, by weight, of antimony in the insoluble ash generally varies from about 49–55%, while sodium is present from about 6–8%, by weight, predominantly in the form of sodium antimonate, with lesser amounts present as sodium carbonate.

The water-soluble fraction of the ash is contained in the liquid phase of the ash-water mixture after suitable agitation. Following separation by filtration or centrifugation, the liquid phase is generally dried in an evaporator at a temperature of from about 175° F to 200° F, for a sufficient period of time to form crystalline material. The composition of the soluble fraction of the ash is typically about 97%, by weight, sodium carbonate monohydrate, 0.75% sodium carbonate, 0.1% sodium chloride, about 50–900 ppm antimony, and detectable amounts of copper, aluminium, magnesium, iron and silicon. The bulk density of the material is about 80 lbs./cu.ft.

EXAMPLE 1

100 gram of spent ethylene glycol residue of the following composition:

| | |
|---|---|
| Sodium | 3.67 (wt.) % |
| Antimony | 0.40 |
| Water | 28.81 |
| Solids (excluding sodium and antimony) | 14.57 |
| Ethylene glycol | 50.37 |
| Diethylene glycol | 1.86 |
| Triethylene glycol | 0.16 |
| Methanol | 0.12 |
| Unknown | 0.04 | was added to a 500 ml Pyrex beaker and converted to ash in a Thermolyne furnace (Model F-A1T30) at 300° F for 6 hours, followed by 1,100° F for 20 hours. The resulting ash, weighing 9.15 grams, contained 40.2 (wt.) % sodium and 4.3 (wt.) % antimony, by analysis. The ash was contacted with 100 ml distilled water at approximately 23° C by stirring in a 300 ml beaker (diameter 2⅜ inch), using a smooth-edged rectangular Teflon stirring paddle (½ inch high by 2 inch wide by ⅛ inch thick), at approximately 200 rpm for approximately 10 minutes. The insolubles were removed by filtration through a fine fritted disk, followed by washing with two 10 ml batches of distilled water. After drying, the insolubles weighed 0.78 grams and analyzed 51.6 (wt.) % antimony and 9.6 (wt.) % sodium. The filtrate was evaporated to dryness in an evaporation disk at 100° C for 20 hours to yield 8.35 grams of solid having an analysis of 43.1 (wt.) % sodium and 120 ppm (w/w) antimony.

EXAMPLE 2

This example illustrates the use of an oxidizing agent to increase the antimony content in the insoluble fraction of the ash. 0.5 gram of insoluble ash containing 52.5 (wt.) % antimony and 9.8 (wt.) % sodium (as determined by X-ray fluorescence) was mixed with 25 ml of 1M nitric acid for a period of 2 hours. The antimony content increased to a level of 60.5 (wt.) % after 2 hours, while the sodium content decreased to 7.14 (wt.) %. Treatment of the ash with nitric acid resulted in conversion of the ash insolubles from $NaSbO_3$ and NaSb, to $Sb_2O_5$ and $Sb_2O_3$, respectively.

EXAMPLE 3

This example illustrates a method of reducing the antimony solubility in the water soluble fraction of the ash by acidification. 20.0 grams of dry ash (having a composition of 1.3 (wt.) % $NaHCO_3$, 89.0 (wt.) % $Na_2CO_3$, 8.5 (wt.) % antimony compounds and 1.2 (wt.) % NaCl were mixed with 200 ml of water and filtered. The antimony content of the filtrate was 24 ppm. 20 ml of the filtrate were brought to a pH of 5.5 with 2.6 ml of 37.8 (wt.) % HCl. A white precipitate was formed. The solution was centrifuged and the supernatant liquid analyzed. The antimony content of the liquid was 4.1 ppm, equivalent to 80.7% antimony removal.

EXAMPLE 4

Example 3 was repeated except the pH of the filtrate was lowered to 1.9 with 2.9 ml of 37.8 (wt.) % HCl. Following centrifugation to remove the precipitate, the antimony content of the supernatant liquid was 18.2 ppm, equivalent to 13.2% antimony removal.

EXAMPLE 5

Example 4 was repeated except that after the solution pH was lowered to 1.9, 10 ml of 1M thioacetamide was added and the solution heated for 20 minutes at 65° C. An orange precipitate was formed. The solution was allowed to cool to room temperature and centrifuged. The antimony content of the supernatant liquid was 0.9 ppm equivalent to 93.8% antimony removal. After evaporation to dryness, the antimony content of the solid residue was 9.8 ppm.

EXAMPLE 6

This example illustrates the reduction of water soluble antimony by complex precipitation. 0.014 gram of magnesium diacetate was added while stirring to 100 ml of a water solution containing 17 (wt.) % ash solubles and 7.1 ppm (w/w) antimony. The solution was allowed to set for one hour after which the precipitate was removed by filtration. The filtrate was found to contain 3.6 ppm (w/w) antimony.

What is claimed is:

1. A process for recovering antimony and sodium compounds from antimony-containing spent ethylene glycol residues resulting from the manufacture of polyethyleneterephthalate polyester which comprises combusting the spent glycol residues with an oxygen-containing gas so as to produce an ash; contacting said ash with water to effect at least a partial separation of the water-soluble sodium compounds from the relatively insoluble antimony compounds thereby forming an ash-water mixture having a liquid phase and a solid phase, the water-soluble sodium compounds being essentially contained in said liquid phase and the water-insoluble antimony compounds being essentially contained in said solid phase; and separating said liquid phase from said solid phase to recover sodium and antimony compounds from said liquid phase and said solid phase, respectively.

2. The process of claim 1 wherein said glycol residues are combusted at a temperature of from about 900° F to about 2,300° F.

3. The process of claim 2 wherein the temperature of combustion is about 1,800° F.

4. The process of claim 1 wherein the weight ratio of water to ash in said mixture is from about 5:1 to 10:1.

5. The process of claim 1 wherein said liquid phase is treated so as to reduce the concentration of antimony in said liquid phase to below about 10 ppm.

* * * * *